(12) United States Patent
Liu

(10) Patent No.: US 11,122,110 B2
(45) Date of Patent: Sep. 14, 2021

(54) BLOCKCHAIN-BASED FILE PROCESSING METHOD, APPARATUS, AND DEVICE, AND STORAGE MEDIUM

(71) Applicant: ADVANCED NEW TECHNOLOGIES CO., LTD., Grand Cayman (KY)

(72) Inventor: Dan Liu, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 16/887,578

(22) Filed: May 29, 2020

(65) Prior Publication Data

US 2020/0296152 A1 Sep. 17, 2020

Related U.S. Application Data

(63) Continuation of application No. PCT/CN2020/071131, filed on Jan. 9, 2020.

(30) Foreign Application Priority Data

Jun. 11, 2019 (CN) .......................... 201910502607.2

(51) Int. Cl.
*G06F 15/16* (2006.01)
*H04L 29/08* (2006.01)
(Continued)

(52) U.S. Cl.
CPC .......... *H04L 67/06* (2013.01); *G06F 16/1744* (2019.01); *H04L 9/0637* (2013.01);
(Continued)

(58) Field of Classification Search
CPC ... H04L 67/06; H04L 9/0637; H04L 67/1036; H04L 67/1097; H04L 2209/38; G06F 16/1744
(Continued)

(56) References Cited

U.S. PATENT DOCUMENTS 9,424,400 B1 8/2016 Blankenbeckler et al.
9,569,771 B2 2/2017 Lesavich et al.
(Continued)

FOREIGN PATENT DOCUMENTS

AU 2016202841 A1 12/2016
CN 101018172 A 8/2007
(Continued)

OTHER PUBLICATIONS

Sarmah, Simanta. (2018). Understanding Blockchain Technology, Aug. 2018, ResearchGate, https://www.researchgate.net/publication/336130918_Understanding_Blockchain_Technology (Year: 2018).*

(Continued)

*Primary Examiner* — Melvin H Pollack

(57) ABSTRACT

Methods, systems, and apparatus, including computer programs encoded on computer storage media, for blockchain-based file processing are provided. One of the methods includes: receiving, from a client, a request for downloading a target file stored in a blockchain, the request comprising a network address of the client and a file address of the target file; identifying, based on the network address information of the client, a target blockchain node associated with the blockchain for downloading the target file, the target blockchain node having a network address that is the closest to the network address of the client among a set of candidate blockchain nodes; downloading the target file from the
(Continued)

determined target blockchain node based on the file address information; and returning the downloaded target file to the client.

20 Claims, 5 Drawing Sheets

(51) Int. Cl.
*G06F 16/174* (2019.01)
*H04L 9/06* (2006.01)

(52) U.S. Cl.
CPC ...... *H04L 67/1036* (2013.01); *H04L 67/1097* (2013.01); *H04L 2209/38* (2013.01)

(58) Field of Classification Search
USPC ........................................................ 709/219
See application file for complete search history.

(56) References Cited

U.S. PATENT DOCUMENTS

| | | | |
|---|---|---|---|
| 9,892,460 B1 | 2/2018 | Winklevoss et al. | |
| 10,158,479 B2 | 12/2018 | Chapman et al. | |
| 10,332,184 B2* | 6/2019 | Glover | G06Q 30/0631 |
| 10,362,058 B2 | 7/2019 | Hu et al. | |
| 10,469,605 B1* | 11/2019 | Batey | H04L 65/4084 |
| 2003/0115288 A1* | 6/2003 | Ljubicich | H04L 67/306 709/219 |
| 2014/0351451 A1* | 11/2014 | Fu | H04L 67/1008 709/231 |
| 2017/0236123 A1 | 8/2017 | Ali et al. | |
| 2017/0279783 A1 | 9/2017 | Milazzo et al. | |
| 2018/0020324 A1 | 1/2018 | Beauford | |
| 2018/0060496 A1 | 3/2018 | Bulleit et al. | |
| 2018/0247191 A1 | 8/2018 | Katz et al. | |
| 2018/0278708 A1* | 9/2018 | Ishihara | H04L 67/2852 |
| 2019/0057115 A1 | 2/2019 | Liu et al. | |
| 2019/0220836 A1 | 7/2019 | Caldwell | |
| 2020/0005254 A1 | 1/2020 | Wright et al. | |

FOREIGN PATENT DOCUMENTS

| | | |
|---|---|---|
| CN | 101399738 A | 4/2009 |
| CN | 101710904 A | 5/2010 |
| CN | 103731472 A | 4/2014 |
| CN | 107770115 A | 3/2018 |
| CN | 108667935 A | 10/2018 |
| CN | 108683728 A | 10/2018 |
| CN | 108737498 A | 11/2018 |
| CN | 110298194 A | 10/2019 |
| KR | 101470346 B1 | 12/2014 |
| KR | 102116659 B1 | 5/2020 |
| WO | 2019139678 A1 | 7/2019 |

OTHER PUBLICATIONS

First Search Report for Chinese Application No. 201910502607.2, dated May 9, 2020, 1 page.
First Office Action for Chinese Application No. 201910502607.2, dated May 14, 2020, 23 pages.
Supplementary Search Report for Chinese Application No. 201910502607.2, dated Jul. 1, 2020, 1 page.
Second Office Action for Chinese Application No. 201910502607.2, dated Jul. 8, 2020, 22 pages.
Written Opinion and International Search Report for PCT Application No. PCT/CN2020/071131 made available to public on Dec. 17, 2020.

* cited by examiner

BLOCKCHAIN-BASED FILE PROCESSING METHOD, APPARATUS, AND DEVICE, AND STORAGE MEDIUM

CROSS-REFERENCE TO RELATED APPLICATION

This application is a continuation application of International Patent Application No. PCT/CN2020/071131, filed with the China National Intellectual Property Administration (CNIPA) on Jan. 9, 2020, which is based on and claims priority to and benefit of Chinese Patent Application No. 201910502607.2, filed with the CNIPA on Jun. 11, 2019. The entire contents of all of the above-identified applications are incorporated herein by reference.

TECHNICAL FIELD

The application relates to the field of blockchain technologies, and in particular, to a blockchain-based file processing method, apparatus, device, and a computer-readable storage medium.

BACKGROUND

As Internet technologies become more and more popular, more users upload or download files, such as files in a format of picture, text, and video, through the Internet.

In current technical solutions, files are usually stored on a large-scale central server, and the files are downloaded from the central server. In the technical solutions, not only downloading efficiency is low, but also problems such as file loss and a download failure, are likely to occur if the central server fails.

SUMMARY

Embodiments of the specification provide a file processing method, apparatus, device, and a computer-readable storage medium to resolve the problems such as file loss and a download failure, caused by a fault of a central server, thereby improving file downloading efficiency.

In order to resolve the technical problems, the embodiments of the specification are implemented as follows.

According to a first aspect of the embodiments of the specification, a blockchain-based file processing method is provided, the method including: receiving a file download request of a client for a target file in a blockchain, the file download request including network address information of the client and file address information of the target file; determining an actual-download node of the target file in the blockchain based on the network address information of the client; and downloading the target file from the actual-download node based on the file address information, and returning the downloaded target file to the client.

In some embodiments of the specification, the determining an actual-download node of the target file in the blockchain based on the network address information of the client includes: selecting a first node closest to the client from a candidate node set based on the network address information of the client, the candidate node set including a node, in the blockchain, from which the client downloads a file a number of times greater than a predetermined threshold number; and using the first node as the actual-download node of the target file in the blockchain.

In some embodiments of the specification, the using the first node as the actual-download node of the target file in the blockchain includes: determining whether a load of the first node is less than a first predetermined threshold; if the load is less than the first predetermined threshold, using the first node as the actual-download node of the target file in the blockchain; and if the load is greater than or equal to the first predetermined threshold, determining the actual-download node of the target file in the blockchain through load balancing based on the network address information.

In some embodiments of the specification, the method further includes: after the downloading is completed, determining whether the actual-download node belongs to the candidate node set; if the actual-download node does not belong to the candidate node set, determining a number of times of downloading a file from the actual-download node; and if the number of downloading times is greater than the predetermined threshold number, adding the actual-download node to the candidate node set.

In some embodiments of the specification, the determining an actual-download node of the target file in the blockchain based on the network address information of the client includes: determining a second node in the blockchain closest to the client based on the network address information of the client; determining whether a load of the second node is less than a second predetermined threshold; if the load is less than the second predetermined threshold, using the second node as the actual-download node of the target file in the blockchain; and if the load is greater than or equal to the second predetermined threshold, determining the actual-download node of the target file in the blockchain through load balancing based on the network address information.

In some embodiments of the specification, the method further includes: if the actual-download node of the target file in the blockchain is determined, forwarding the file download request to the actual-download node; and extracting the file address information of the target file from the file download request.

In some embodiments of the specification, the method further includes: performing a hash operation on the target file to obtain a hash value of the target file; and generating the file address information of the target file based on the hash value and a predetermined character string.

In some embodiments of the specification, the method further includes: receiving a file upload request to upload the target file to the blockchain; controlling each node in the blockchain to perform consensus processing on the target file; and if all nodes in the blockchain reach a consensus, synchronizing the target file to each node in the blockchain.

In some embodiments of the specification, the returning the downloaded target file to the client includes: extracting identification information of the client from the file download request; if it is determined according to the identification information that the client is a mobile client, compressing the target file; and returning the compressed target file to the client.

According to a second aspect of the embodiments of the specification, a blockchain-based file processing method implemented on a client is provided, the method including: sending a file download request for a target file in a blockchain, the file download request including network address information of the client and file address information of the target file; receiving the target file returned by an actual-download node in the blockchain based on the file address information, the actual-download node being determined according to the network address information.

In some embodiments of the specification, the sending a file download request for a target file in a blockchain includes: sending the file download request for the target file to a candidate node in the blockchain, the candidate node including a node in the blockchain from which a file is downloaded a number of times greater than a predetermined threshold number.

In some embodiments of the specification, the file processing method further includes: determining a number of times of downloading a file from the actual-download node; and if the number of downloading times is greater than the predetermined threshold number, using the actual-download node as a candidate node for the client to download a file from the blockchain.

According to a third aspect of the embodiments of the specification, a blockchain-based file processing apparatus is provided, the apparatus including: a first receiving module configured to receive a file download request of a client for a target file in a blockchain, the file download request including network address information of the client and file address information of the target file; a node determining module configured to determine an actual-download node of the target file in the blockchain based on the network address information of the client; and a downloading module configured to: download the target file from the actual-download node based on the file address information, and return the downloaded target file to the client.

In some embodiments of the specification, the node determining module includes: a first node determining unit configured to select a first node closest to the client from a candidate node set based on the network address information of the client, the candidate node set including a node, in the blockchain, from which the client downloads a file a number of times greater than a predetermined threshold number; and a download node determining unit configured to use the first node as the actual-download node of the target file in the blockchain.

In some embodiments of the specification, the download node determining unit includes: a judging unit configured to determine whether a load of the first node is less than a first predetermined threshold; a first determining unit configured to, if the load is less than the first predetermined threshold, use the first node as the actual-download node of the target file in the blockchain; and a second determining unit configured to, if the load is greater than or equal to the first predetermined threshold, determine the actual-download node of the target file in the blockchain through load balancing based on the network address information.

In some embodiments of the specification, the file processing apparatus further includes: a node judging module configured to, after the downloading is completed, determine whether the actual-download node belongs to the candidate node set; a downloading times determining module configured to, if the actual-download node does not belong to the candidate node set, determine a number of times of downloading a file from the actual-download node; and a node adding module configured to, if the number of downloading times is greater than the predetermined threshold number, add the actual-download node to the candidate node set.

In some embodiments of the specification, the node determining module includes: a second node determining unit configured to determine a second node in the blockchain closest to the client based on the network address information of the client; a load judging unit configured to determine whether a load of the second node is less than a second predetermined threshold; a third determining unit configured to, if the load is less than the second predetermined threshold, use the second node as the actual-download node of the target file in the blockchain; and a fourth determining unit configured to, if the load is greater than or equal to the second predetermined threshold, determine the actual-download node of the target file in the blockchain through load balancing based on the network address information.

In some embodiments of the specification, the file processing apparatus further includes: a forwarding module configured to, if the actual-download node of the target file in the blockchain is determined, forward the file download request to the actual-download node; and an extracting module configured to extract the file address information of the target file from the file download request.

In some embodiments of the specification, the file processing apparatus further includes: a hash processing module configured to perform a hash operation on the target file to obtain a hash value of the target file; and an address generating module configured to generate the file address information of the target file based on the hash value and a predetermined character string.

In some embodiments of the specification, the file processing apparatus further includes: a second receiving module configured to receive a file upload request to upload the target file to the blockchain; a consensus module configured to control each node in the blockchain to perform consensus processing on the target file; and a synchronizing module configured to, if all nodes in the blockchain reach a consensus, synchronize the target file to each node in the blockchain.

In some embodiments of the specification, the downloading module includes: an identification extracting unit configured to extract identification information of the client from the file download request; a compressing unit configured to, if it is determined according to the identification information that the client is a mobile client, compress the target file; and a returning unit configured to return the compressed target file to the client.

According to a fourth aspect of the embodiments of the specification, a blockchain-based file processing apparatus implemented on a client is provided, the apparatus including: a sending module configured to send a file download request for a target file in a blockchain, the file download request including network address information of the client and file address information of the target file; a receiving module configured to receive the target file returned by an actual-download node in the blockchain based on the file address information, the actual-download node being determined according to the network address information.

In some embodiments of the specification, the sending module is configured to: send the file download request for the target file to a candidate node in the blockchain, the candidate node including a node in the blockchain from which a file is downloaded a number of times greater than a predetermined threshold number.

In some embodiments of the specification, the file processing apparatus further includes: a downloading times determining module configured to determine a number of times of downloading a file from the actual-download node; and a candidate node determining module configured to, if the number of downloading times is greater than the predetermined threshold number, use the actual-download node as a candidate node for the client to download a file from the blockchain.

According to a fifth aspect of the embodiments of the specification, a blockchain-based file processing device is provided, the device including: a processor; and a memory configured to store a computer-executable instruction that, when executed, causes the processor to implement the steps in the foregoing file processing method according to the first aspect or the second aspect.

According to a sixth aspect of the embodiments of the specification, a storage medium is provided for storing a computer-executable instruction. When the computer-executable instruction executed, the steps in the file processing method according to the first aspect or the second aspect are implemented.

In another aspect, a method for blockchain-based file processing is provided. The method includes: receiving, from a client, a request for downloading a target file stored in a blockchain, the request comprising a network address of the client and a file address of the target file; identifying, based on the network address information of the client, a target blockchain node associated with the blockchain for downloading the target file, the target blockchain node having a network address that is the closest to the network address of the client among a set of candidate blockchain nodes; downloading the target file from the determined target blockchain node based on the file address information; and returning the downloaded target file to the client.

In an embodiment, the set of candidate blockchain nodes comprises a plurality of blockchain nodes, from which the client has downloaded files for a number of times greater than a predetermined threshold number.

In an embodiment, the determining a target blockchain node associated with the blockchain for downloading the target file comprises: identifying a first blockchain node having a network address that is the closest to the network address of the client among the set of candidate blockchain nodes; determining whether a load of the target blockchain node is less than a threshold; if the load is less than the threshold, using the first blockchain node as the target blockchain node; and if the load is greater than or equal to the threshold, determining the target blockchain node through load balancing based on the network address information.

In an embodiment, the downloading the target file from the determined target blockchain node based on the file address information comprises: forwarding the request for downloading the target file to the identified target blockchain node; and extracting the file address of the target file from the request for downloading the target file.

In the embodiment, the method further comprises: performing a hash operation on the target file to obtain a hash value of the target file; and generating the file address of the target file based on the hash value and a predetermined character string.

In an embodiment, the method further comprises: receiving a request for uploading the target file to the blockchain; and broadcasting the target file to a plurality of blockchain nodes associated with the blockchain for storing based on consensus processing.

In an embodiment, the returning the downloaded target file to the client comprises: extracting identification information of the client from the request for downloading the target file; determining, based on the extracted identification information, that the client is a mobile client; compressing the target file; and returning the compressed target file to the client.

In yet another aspect, a system for blockchain-based file processing is provided. The system comprises a processor and a non-transitory computer-readable storage medium storing instructions executable by the processor to cause the system to perform operations. The operations includes: receiving, from a client, a request for downloading a target file stored in a blockchain, the request comprising a network address of the client and a file address of the target file; identifying, based on the network address information of the client, a target blockchain node associated with the blockchain for downloading the target file, the target blockchain node having a network address that is the closest to the network address of the client among a set of candidate blockchain nodes; downloading the target file from the determined target blockchain node based on the file address information; and returning the downloaded target file to the client.

In still another aspect, a non-transitory computer-readable storage medium for blockchain-based file processing is provided. The medium is configured with instructions executable by one or more processors to cause the one or more processors to perform operations. The operations includes: receiving, from a client, a request for downloading a target file stored in a blockchain, the request comprising a network address of the client and a file address of the target file; identifying, based on the network address information of the client, a target blockchain node associated with the blockchain for downloading the target file, the target blockchain node having a network address that is the closest to the network address of the client among a set of candidate blockchain nodes; downloading the target file from the determined target blockchain node based on the file address information; and returning the downloaded target file to the client.

According to the technical solutions in the embodiments of the specification, on the one hand, the target file is stored in the blockchain. In this way, the file can be prevented from being tampered with and lost. On the other hand, the actual-download node of the target file in the blockchain is determined based on the network address information of the client, and the target file is downloaded from the actual-download node. In this way, not only the file downloading efficiency can be improved, but also decentralized downloading of the file can be achieved, thereby avoiding problems such as file loss and a download failure caused by a fault of the central server.

BRIEF DESCRIPTION OF THE DRAWINGS

To describe the technical solutions in the embodiments of the specification or in the prior art more clearly, the following description briefly introduces the accompanying drawings required for describing the embodiments of the specification or the prior art. The accompanying drawings in the following description show merely some embodiments of the specification, and a person of ordinary skill in the art may still derive other drawings from these accompanying drawings without creative efforts.

DETAILED DESCRIPTION OF THE INVENTION

To enable a person skilled in the art to better understand the technical solutions of the specification, the technical solutions of the embodiments of the specification will be described clearly and thoroughly below with reference to the accompanying drawings of the embodiments of the specification. The described embodiments are merely some rather than all of the embodiments of the specification. All other embodiments obtained by a person of ordinary skill in the art based on the embodiments of the specification without creative efforts shall fall within the protection scope of the specification.

Figure 1:
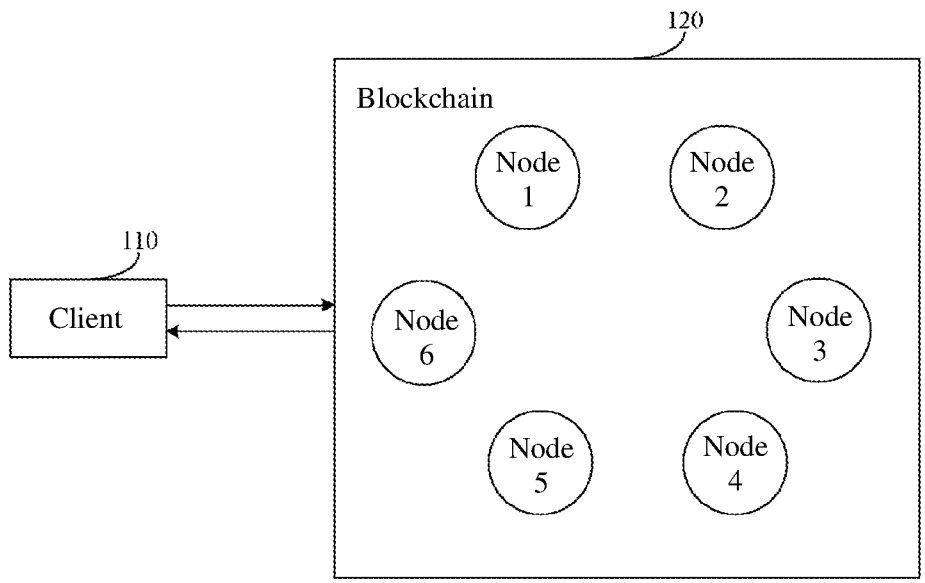
FIG. 1 is a schematic block diagram of an application scenario of a file processing method, according to some embodiments of the specification.

FIG. 1 is a schematic block diagram of an application scenario of a file processing method, according to some embodiments of the specification. As shown in FIG. 1, the application scenario includes a client 110 and a blockchain 120. The blockchain 120 includes nodes 1 to 6. Each node stores s target file and network addresses, that is, Internet Protocol (IP) address information of other nodes. The client 110 sends, to the node 2 of the blockchain 120, a file download request to download the target file stored in the blockchain, and the file download request comprises a network address (i.e., an IP address) of the client and a file address of the target file. The node 2 includes IP address information of other nodes, that is, the nodes 1, 3, 4, 5, and 6 in the blockchain 120. After receiving a request for downloading a target file (i.e., the file download request from the client 110), the node 2 of the blockchain 120 extracts IP address information of the client from the file download request, and determines, based on the IP address information of the client, a target blockchain node associated with the blockchain for downloading the target file, such as a node having a network address is the closest to the network address of the client 110, for example, the node 6, among a set of candidate blockchain nodes (i.e., nodes 1 to 6). The node 2 forwards the file download request to the node 6, downloads the target file from the node 6, and returns the downloaded target file to the client 110.

In the embodiments of the specification, the client 110 may be a mobile phone, a tablet computer, a desktop computer, a portable notebook computer, or a vehicle-mounted computer, etc. The blockchain 120 can guarantee features of decentralized, untampered, safe, and reliable, for storage of a target file without introducing a third-party intermediary structure.

The file processing method in an embodiment of the specification is described below with reference to FIG. 2 and the application scenario in FIG. 1. The application scenario is merely shown for facilitating understanding of the spirit and principle of the specification, and the embodiments of the specification are not limited thereto. Instead, the embodiments of the specification may be applied to any scenario that is applicable.

Figure 2:
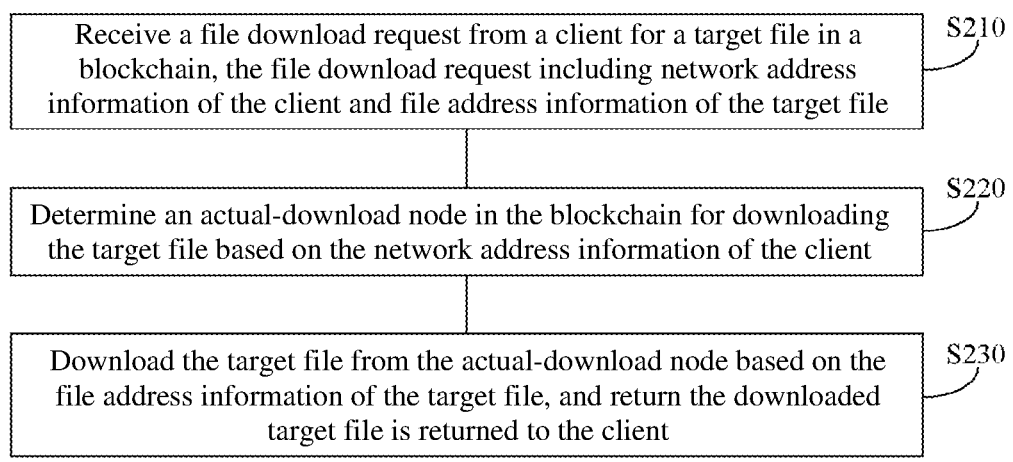
FIG. 2 is a flowchart of a file processing method, according to some embodiments of the specification.

FIG. 2 is a flowchart of a file processing method, according to some embodiments of the specification. The file processing method may be applied to the nodes in the blockchain in FIG. 1. Referring to FIG. 2, the file processing method includes steps S210 to S230. The file processing method in the embodiment is described in detail below with reference to FIG. 2.

In step S210, a file download request from a client for a target file in a blockchain is received, the file download request including network address information of the client and file address information of the target file.

In the embodiment, each node in the blockchain stores the target file and network address information of other nodes. The file address information of the target file may be a hash address generated after a hash operation is performed on the target file, or may be other appropriate address information. The target file may be a picture, text, or video file. No specific limitation is imposed on this in the specification.

Further, the network address information of the client may be an IP address of the client. The client sends the file download request for the target file to a target node in the blockchain. The file download request includes the network address information of the client and the file address information of the target file. The target node in the blockchain receives the file download request and extracts the network address information of the client from the file download request. The target node may be a historical node stored on the client for downloading a file from the blockchain, or may be a node selected by a user from a plurality of nodes in the blockchain, or may be a node in the blockchain from which the client downloads a file a number of times greater than a predetermined threshold number, for example, 10.

In step S220, a target blockchain node associated with the blockchain, such as an actual-download node for downloading the target file in the blockchain is determined based on the network address information of the client.

In an embodiment, each node in the blockchain stores network address information of other nodes. A node closest to the client is determined based on the network address information of the client and the network address information of each node in the blockchain. For example, a node closest to the client in a geographical location or a network location is used as the actual-download node of the target file in the blockchain.

Further, in some embodiments, the node in the blockchain closest to the client is determined based on the network address information of the client. It is determined whether a load of the node is less than a predetermined threshold. If the load is less than the predetermined threshold, the node is used as the actual-download node of the target file in the blockchain. If the load is greater than or equal to the predetermined threshold, the actual-download node of the target file in the blockchain is determined through load balancing based on the network address information. Determining the actual-download node of the target file in the blockchain through load balancing can avoid slow downloading caused by an excessive load of the node, thereby improving file downloading efficiency.

In addition, in other embodiments, a first node closest to the client is selected from a set of candidate nodes based on the network address information of the client. The candidate node set including a plurality of candidate nodes of a blockchain may include a node from which the client frequently downloads a file. For example, the candidate node set includes a node, in the blockchain, from which the client downloads a file a number of times greater than a predetermined threshold number. The first node is used as the actual-download node of the target file in the blockchain. Since nodes in the established candidate node set are nodes from which the client frequently downloads a file and frequently used by the client, a node closer to the client and facilitating downloading can be quickly determined, thereby improving file downloading efficiency.

Step S230, the target file is downloaded from the target blockchain node, such as the actual-download node, based on the file address information of the target file, and the downloaded target file is returned to the client.

In an embodiment, after the actual-download node of the target file in the blockchain is determined, the file download request is forwarded to the actual-download node, and the file address information, such as hash address information of the target file is extracted from the file download request. A corresponding target file is searched for from the actual-download node based on the file address information of the target file. After the target file is found, the target file is downloaded and the downloaded target file is returned to the client.

According to the file processing method in the embodiment in FIG. 2, on the one hand, the target file is stored in the blockchain. In this way, the file can be from being tampered with and lost. On the other hand, the actual-download node of the target file in the blockchain is determined based on the network address information of the client, and the target file is downloaded from the actual-download node. In this way, not only the file downloading efficiency can be improved, but also decentralized downloading of the file can be achieved, thereby avoiding problems such as file loss and a download failure caused by a fault of the central server.

Further, in an embodiment, a hash operation is performed on the target file to obtain a hash value of the target file. The file address information of the target file is generated based on the hash value of the target file and a predetermined character string. The file address information of the target file is generated based on the hash value of the target file, so that file content of the target file can be prevented from being tampered with, thereby ensuring accuracy of the file content. The file address information of the target file can uniquely identify the file. If the file is tampered with, the file address information of the file also changes. Through comparison of the file address information of the file, it may be determined whether the file is tampered with.

In addition, in an embodiment, a file upload request to upload the target file to the blockchain is received. Each node in the blockchain is controlled to perform consensus processing on the target file. If all nodes in the blockchain reach a consensus, the target file is synchronized to each node in the blockchain. Each node in the blockchain performs consensus processing on the target file, so that the file can be prevented from being tampered with, thereby improving security of the file. The target file is broadcasted to a plurality of blockchain nodes associated with the blockchain for storing based on consensus processing. The consensus processing in the specification may be performed using a Proof of Work (POW) method, a Proof of Stake (POS) method, or a Delegated Proof of Stake (DPOS) method. No specific limitation is imposed on this in the specification.

Further, in an embodiment, after downloading from the actual-download node is completed, the downloaded target file is returned to the client. In order to improve file transferring efficiency, the identification information of the client is extracted from the file download request, and it is determined according to the identification information whether the client is a mobile client. If it is determined, according to the identification information, that the client is a mobile client, the target file is compressed. The compressed target file is returned to the client.

Figure 3:
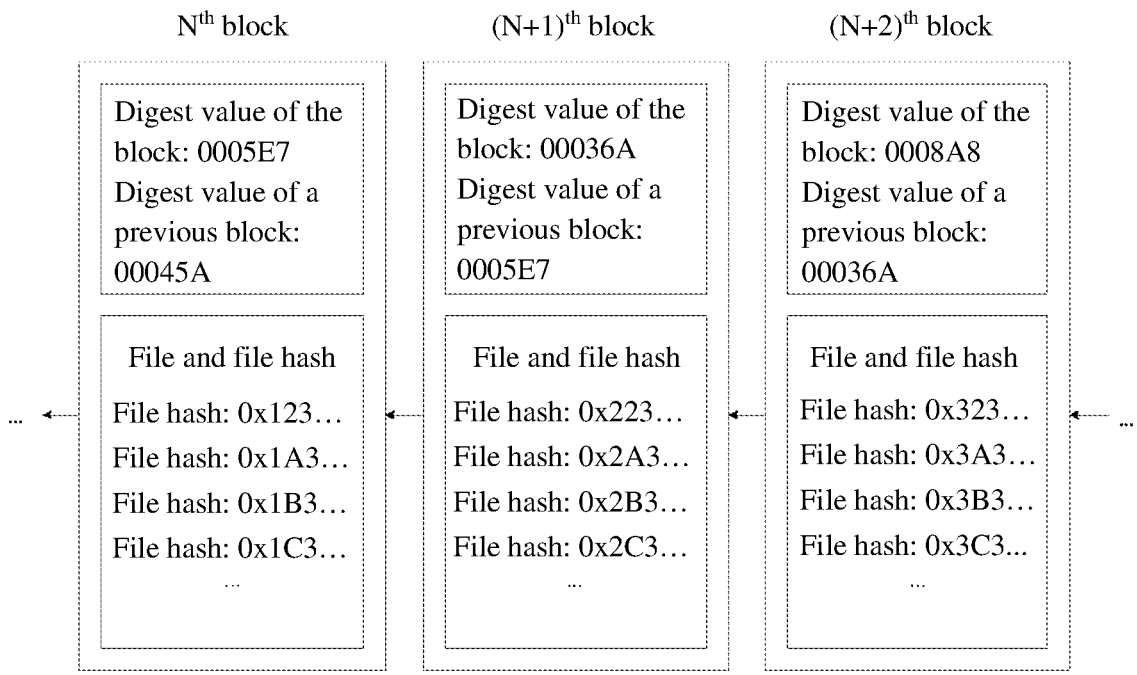
FIG. 3 is a schematic diagram of a blockchain, according to some embodiments of the specification.

FIG. 3 is a schematic diagram of a blockchain, according to some embodiments of the specification. Referring to FIG. 3, each block in the blockchain stores a file and a hash address of the file, and a header of each block stores a digest value of the block and a digest value of a previous block. Each block in the blockchain has a chain data structure, to ensure that data in the blockchain may be changed in only an incremental manner. Data recorded in the blockchain always remain as the data that is when the data created and is not overwritten.

Figure 4:
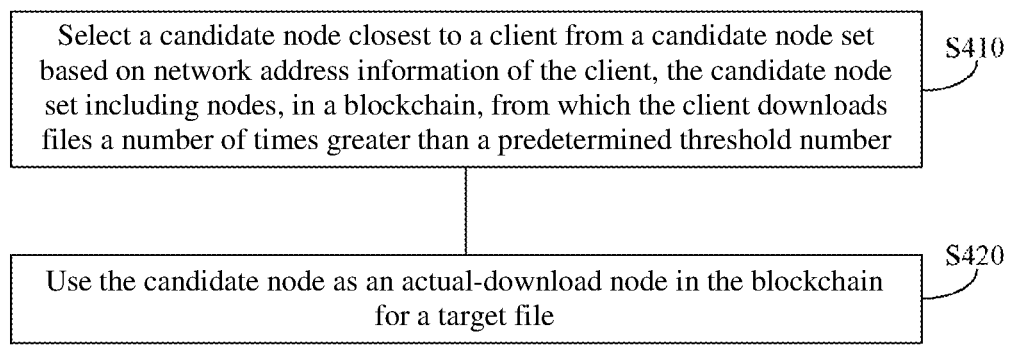
FIG. 4 is a flowchart of determining an actual-download node, according to some embodiments of the specification.

FIG. 4 is a flowchart of determining an actual-download node, according to some embodiments of the specification.

Referring to FIG. 4, in step S410, a candidate node closest to the client is selected from a candidate node set based on the network address information of the client, the candidate node set including a node, in the blockchain, from which the client downloads a file a number of times greater than a predetermined threshold number.

In an embodiment, the candidate node set includes a node in the blockchain from which the client frequently downloads a file. In particular, the candidate node set includes a node, in the blockchain, from which the client downloads a file a number of times greater than a predetermined threshold number. The predetermined threshold number may be determined according to a total number of times the client downloads a file from the blockchain and a number of nodes. For example, the client downloads a file 60 times from six nodes in the blockchain. Therefore, the predetermined threshold number may be 10.

In addition, in an embodiment, after the downloading from the actual-download node is completed, it is determined whether the actual-download node belongs to the candidate node set. If the actual-download node does not belong to the candidate node set, a number of times of downloading a file from the actual-download node is calculated. If the calculated number of downloading times is greater than the predetermined threshold number, the actual-download node is added to the candidate node.

Further, in an embodiment, IP address information of each candidate node in the candidate node set is obtained, and the candidate node closest to the client is determined based on the IP address information of the candidate node and the IP address information of the client.

In step S420, the candidate node is used as the actual-download node of the target file in the blockchain.

In an embodiment, after the candidate node in the candidate node set that is closest to the client is determined, the candidate node may be directly used as the actual-download node of the target file in the blockchain. Since nodes in the established candidate node set are nodes from which the client frequently downloads a file and frequently used by the client, a node closer to the client and facilitating downloading can be quickly determined, thereby improving file downloading efficiency.

In addition, in some embodiments, after the candidate node in the candidate node set that is closest to the client is determined, it is determined whether a load of the candidate node is less than, for example, a predetermined threshold. If the load is less than the predetermined threshold, the candidate node is used as the actual-download node of the target file in the blockchain. If the load is greater than or equal to the predetermined threshold, the actual-download node of the target file in the blockchain is determined through load balancing based on the network address information. For example, if the candidate node has an excessive load, a node that is closest to the client and a load thereof is less than the predetermined threshold may be determined from other nodes except the candidate node through load balancing, and the determined node is used as the actual-download node of the target file in the blockchain. Determining the actual-download node of the target file through load balancing can avoid relatively slow downloading caused by an excessive load of the node, thereby improving file downloading efficiency.

Figure 5:
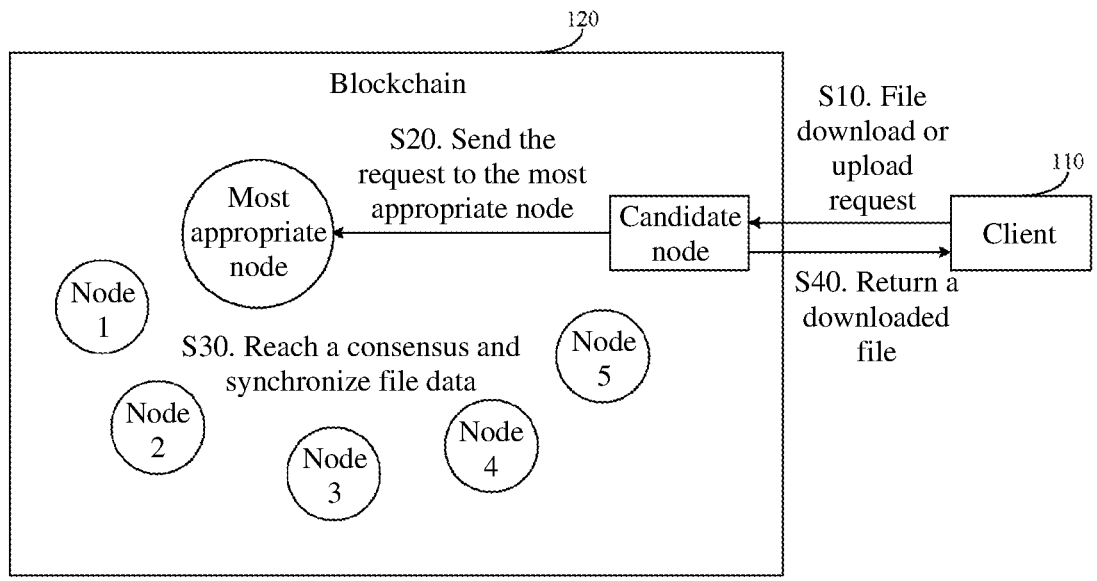
FIG. 5 is a schematic flowchart of a file processing method, according to some other embodiments of the specification.

FIG. 5 is a schematic flowchart of a file processing method, according to some other embodiments of the specification.

In step S10, the client 110 sends a file download request or a file upload request to the blockchain 120. The file download request or the file upload request is sent to a candidate node. In case of a file download request, it is determined whether the load of the candidate node is greater than a predetermined threshold. If the load is greater than the predetermined threshold, step S20 is performed. In case of a file upload request, step S30 is performed.

In step S20, IP address information of the client is extracted from the file download request, and the file download request is forwarded to a node most suitable for the client in a geographical location or a network location based on the IP address information of the client. For example, the most suitable node is a node that is closest to the client in a geographical location or a network location and whose load is less than the predetermined threshold.

In step S30, each node in the blockchain is controlled to perform consensus processing on a to-be-uploaded file. If the nodes in the blockchain reach a consensus, data of the to-be-uploaded file is broadcasted or synchronized to each node in the blockchain for storing.

In step S40, a downloaded file is returned to the client. Further, in order to improve file transferring efficiency, identification information of the client is extracted from the file download request, and it is determined according to the identification information whether the client is a mobile client. If it is determined according to the identification information that the client is a mobile client, the target file is compressed. The compressed target file is returned to the client.

In addition, in an embodiment, if a user is at an extremely remote geographical location, blockchain nodes may be voluntarily established to establish a download node for the user for delicately providing a file downloading service to the user, thereby solving the problems of slow requesting and a request failure.

Figure 6:
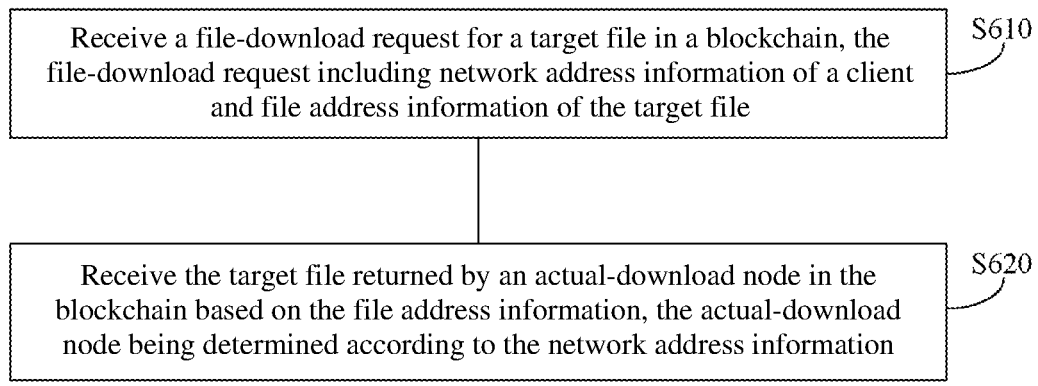
FIG. 6 is a flowchart of a file processing method, according to some other embodiments of the specification.

FIG. 6 is a flowchart of a file processing method, according to some other embodiments of the specification. The file processing method is implemented on a client. The client may be a mobile phone, a tablet computer, a desktop computer, a portable notebook computer, or a vehicle-mounted computer, etc. The file processing method in the embodiment is described in detail below with reference to FIG. 6.

Referring to FIG. 6, in step S610, a file download request for a target file in a blockchain is received, the file download request including network address information of the client and file address information of the target file.

In the embodiment, each node in the blockchain stores the target file and network address information of other nodes. The file address information of the target file may be a hash address generated after a hash operation is performed on the target file, or may be other appropriate address information. The target file may be a picture, text, or video file. No specific limitation is imposed on this in the specification.

Further, the network address information of the client is an IP address of the client. The client sends the file download request for the target file to a target node in the blockchain. The file download request includes the network address information of the client and the file address information of the target file. The target node in the blockchain receives the file download request and extracts the network address information of the client from the file download request. The target node may be a historical node stored on the client for downloading a file from the blockchain, or may be a node selected by a user from a plurality of nodes in the blockchain, or may be a node, in the blockchain, from which the client downloads a file a number of times greater than a predetermined threshold number, for example, 10.

In step S620, the target file returned by an actual-download node in the blockchain based on the file address information is received, the actual-download node being determined according to the network address information.

In an embodiment, each node in the blockchain stores network address information of other nodes. At the blockchain side, a node closest to the client is determined based on the network address information of the client and the network address information of each node in the blockchain. For example, a node closest to the client in a geographical location or a network location is used as the actual-download node of the target file in the blockchain. A file is downloaded from the actual-download node, and the downloaded file is returned to the client.

According to the file processing method in the embodiment in FIG. 6, on the one hand, the target file is stored in the blockchain. In this way, the file can be prevented from being tampered with and lost. On the other hand, the actual-download node of the target file in the blockchain is determined based on the network address information of the client, and the target file is downloaded from the actual-download node. In this way, not only the file downloading efficiency can be improved, but also decentralized downloading of the file can be achieved, thereby avoiding problems such as file loss and a download failure caused by a fault of the central server.

Further, in an embodiment, a file download request for a target file is sent to a candidate node in the blockchain. The candidate node set includes a node in the blockchain from which the client frequently downloads a file. In particular, the candidate node set includes a node, in the blockchain, from which the client downloads a file a number of times greater than a predetermined threshold number. The predetermined threshold number may be determined according to a total number of times the client downloads a file from the blockchain and a number of nodes. For example, the client downloads a file 60 times from six nodes in the blockchain. Therefore, the predetermined threshold number may be 10.

In addition, in an embodiment, after the client receives the returned target file, a number of times of downloading a file from the actual-download node is determined. If the number of downloading times is greater than a predetermined times number, the actual-download node is used as a candidate node for the client to download a file from the block connection.

Figure 7:
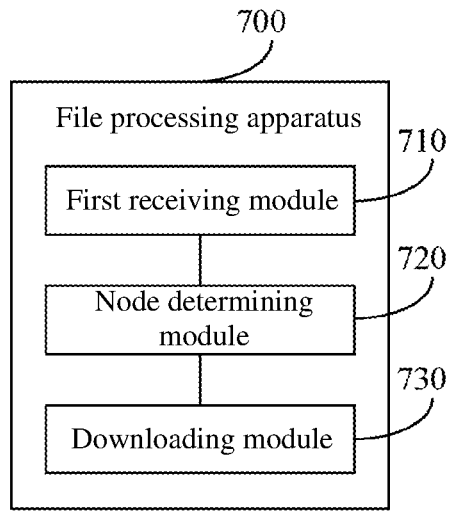
FIG. 7 is a schematic block diagram of a file processing apparatus, according to some embodiments of the specification.
Figure 8:
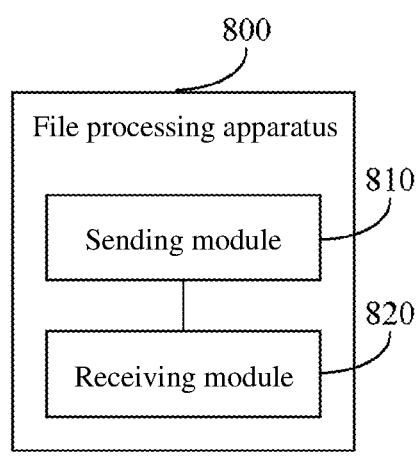
FIG. 8 is a schematic block diagram of a file processing apparatus, according to some other embodiments of the specification.

Further, in an embodiment of the specification, a file processing apparatus is further provided. Referring to FIG. 7, a file processing apparatus 700 includes a first receiving module 710, a node determining module 720, and a downloading module 730. The first receiving module 710 is configured to receive a file download request of a client for a target file in a blockchain, the file download request including network address information of the client and file address information of the target file. The node determining module 720 is configured to determine a target blockchain node or an actual-download node of the target file in the blockchain based on the network address information of the client. The downloading module 730 is configured to download the target file from the actual-download node based on the file address information, and return the downloaded target file to the client.

In some embodiments of the specification, based on the foregoing solution, the node determining module 720 includes a first node determining unit configured to select a first node closest to the client from a candidate node set based on the network address information of the client, the candidate node set including a node, in the blockchain, from which the client downloads a file a number of times greater than a predetermined threshold number, and a download node determining unit configured to use the first node as the actual-download node of the target file in the blockchain.

In some embodiments of the specification, based on the foregoing solution, the download node determining unit includes: a judging unit configured to determine whether a load of the first node is less than a first predetermined threshold; a first determining unit configured to, if the load is less than the first predetermined threshold, use the first node as the actual-download node of the target file in the blockchain; and a second determining unit configured to, if the load is greater than or equal to the first predetermined threshold, determine the actual-download node of the target file in the blockchain through load balancing based on the network address information.

In some embodiments of the specification, based on the foregoing solution, the file processing apparatus 700 further includes: a node judging module configured to, after the downloading is completed, determine whether the actual-download node belongs to the candidate node set; a downloading times determining module configured to, if the actual-download node does not belong to the candidate node set, determine a number of times of downloading a file from the actual-download node; and a node adding module configured to, if the number of downloading times is greater than the predetermined threshold number, add the actual-download node to the candidate node set.

In some embodiments of the specification, based on the foregoing solution, the node determining module 720 includes: a second node determining unit configured to determine a second node in the blockchain closest to the client based on the network address information of the client; a load judging unit configured to determine whether a load of the second node is less than a second predetermined threshold; a third determining unit configured to, if the load is less than the second predetermined threshold, use the second node as the actual-download node of the target file in the blockchain; and a fourth determining unit configured to, if the load is greater than or equal to the second predetermined threshold, determine the actual-download node of the target file in the blockchain through load balancing based on the network address information.

In some embodiments of the specification, based on the foregoing solution, the file processing apparatus 700 further includes: a forwarding module configured to, if the actual-download node of the target file in the blockchain is determined, forward the file download request to the actual-download node; and an extracting module configured to extract the file address information of the target file from the file download request.

In some embodiments of the specification, based on the foregoing solution, the file processing apparatus 700 further includes a hash processing module configured to perform a hash operation on the target file to obtain a hash value of the target file, and an address generating module configured to generate the file address information of the target file based on the hash value and a predetermined character string.

In some embodiments of the specification, based on the foregoing solution, the file processing apparatus further includes: a second receiving module configured to receive a file upload request to upload the target file to the blockchain; a consensus module configured to control each node in the blockchain to perform consensus processing on the target file; and a synchronizing module configured to, if all nodes in the blockchain reach a consensus, broadcast or synchronize the target file to each node in the blockchain for storing.

In some embodiments of the specification, based on the foregoing solution, the downloading module includes: an identification extracting unit configured to extract identification information of the client from the file download request; a compressing unit configured to, if it is determined according to the identification information that the client is a mobile client, compress the target file; and a returning unit configured to return the compressed target file to the client.

According to the file processing apparatus in the embodiment in FIG. 7, on the one hand, the target file is stored in the blockchain. In this way, the file can be prevented from being tampered with and lost. On the other hand, the actual-download node of the target file in the blockchain is determined based on the network address information of the client, and the target file is downloaded from the actual-download node. In this way, not only the file downloading efficiency can be improved, but also decentralized downloading of the file can be achieved, thereby avoiding problems such as file loss and a download failure caused by a fault of the central server.

In addition, in other embodiments of the specification, a blockchain-based file processing apparatus is further provided. The file processing apparatus may be applied to a client. Referring to FIG. 800, a file processing apparatus 800 includes a sending module 810 and a receiving module 820. The sending module 810 is configured to send a file download request for a target file in a blockchain, the file download request including network address information of the client and file address information of the target file. The receiving module 820 is configured to receive the target file returned by an actual-download node in the blockchain based on the file address information, the actual-download node being determined according to the network address information.

In some embodiments of the specification, based on the foregoing solution, the sending module 810 is configured to send the file download request for the target file to a candidate node in the blockchain, the candidate node including a node in the blockchain from which a file is downloaded a number of times greater than a predetermined threshold number.

In some embodiments of the specification, based on the foregoing solution, the file processing apparatus 800 further includes: a downloading times determining module configured to determine a number of times of downloading a file from the actual-download node; and a candidate node determining module configured to, if the number of downloading times is greater than the predetermined threshold number, use the actual-download node as a candidate node for the client to download a file from the blockchain.

The file processing apparatus in this embodiment of the specification can implement the processes in the foregoing method embodiments and achieve same functions and effects. Details are not described herein again.

Figure 9:
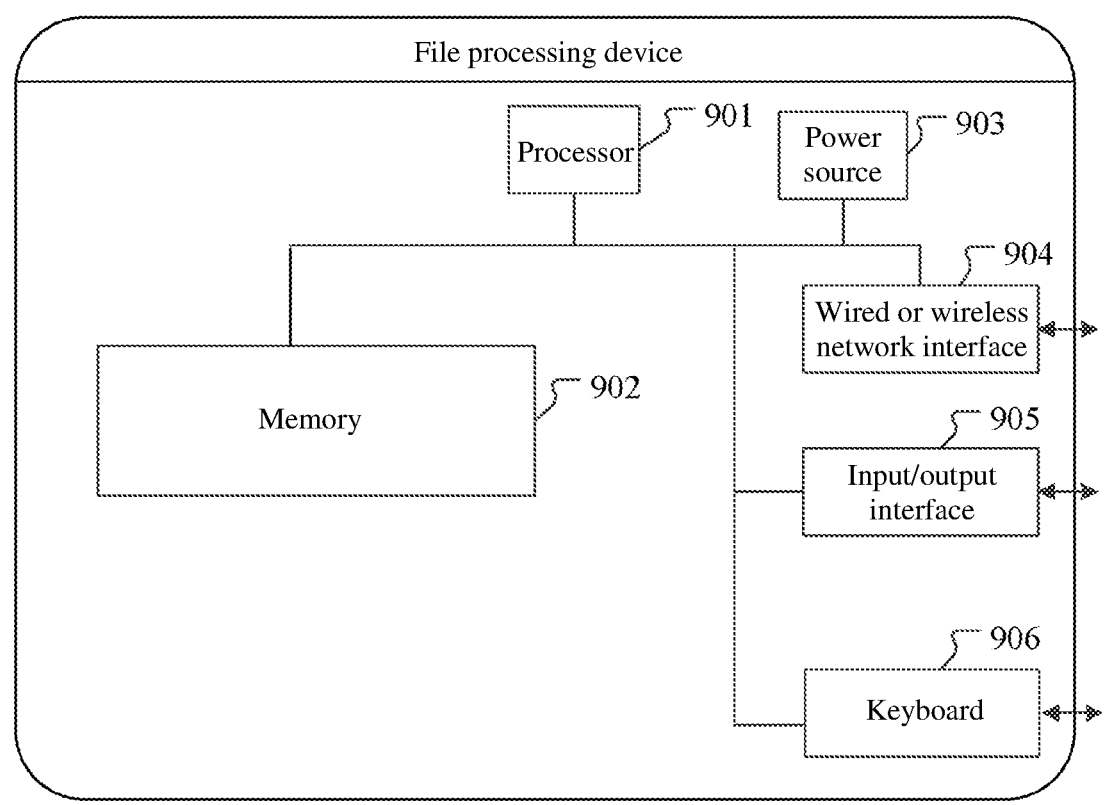
FIG. 9 is a schematic block diagram of a file processing device, according to some embodiments of the specification.

Further, as shown in FIG. 9, an embodiment of the specification further provides a file processing device.

The file processing device may have a relatively large difference due to different configurations or performance, and may include one or more processors 901 and a memory 902. The memory 902 may store one or more applications or data. The memory 902 may be a transient or persistent memory. The application stored in the memory 902 may include one or more modules (not shown). Each module may include a series of computer-executable instructions in the file processing device. Further, the processor 901 may be configured to communicate with the memory 902 and execute a series of computer-executable instructions in the memory 902 on the file processing device. The file processing device may further include one or more power sources 903, one or more wired or wireless network interfaces 904, one or more input/output interfaces 905, one or more keyboards 906, etc.

In a specific embodiment, the file processing device includes a memory and one or more programs. The one or more programs are stored in the memory, and the one or more programs may include one or more modules. Each module may include a series of computer-executable instructions in the file processing device, and the one or more processors are configured to execute the one or more programs to execute the following computer-executable instructions: receiving a file download request of a client for a target file in a blockchain, the file download request including network address information of the client and file address information of the target file; determining a target blockchain node or an actual-download node of the target file in the blockchain based on the network address information of the client; and downloading the target file from the actual-download node based on the file address information, and returning the downloaded target file to the client.

In an embodiment, during execution of the computer-executable instructions, the determining an actual-download node of the target file in the blockchain based on the network address information of the client includes: selecting a first node closest to the client from a candidate node set based on the network address information of the client, the candidate node set including a node, in the blockchain, from which the client downloads a file a number of times greater than a predetermined threshold number; and using the first node as the actual-download node of the target file in the blockchain.

In an embodiment, during execution of the computer-executable instructions, the using the first node as the actual-download node of the target file in the blockchain includes: determining whether a load of the first node is less than a first predetermined threshold; if the load is less than the first predetermined threshold, using the first node as the actual-download node of the target file in the blockchain; and if the load is greater than or equal to the first predetermined threshold, determining the actual-download node of the target file in the blockchain through load balancing based on the network address information.

In an embodiment, during execution of the computer-executable instructions, the method further includes: after the downloading is completed, determining whether the actual-download node belongs to the candidate node set; if the actual-download node does not belong to the candidate node set, determining a number of times of downloading a file from the actual-download node; and if the number of downloading times is greater than the predetermined threshold number, adding the actual-download node to the candidate node set.

In an embodiment, during execution of the computer-executable instructions, the determining an actual-download node of the target file in the blockchain based on the network address information of the client includes: determining a second node in the blockchain closest to the client based on the network address information of the client; determining whether a load of the second node is less than a second predetermined threshold; if the load is less than the second predetermined threshold, using the second node as the actual-download node of the target file in the blockchain; and if the load is greater than or equal to the second predetermined threshold, determining the actual-download node of the target file in the blockchain through load balancing based on the network address information.

In an embodiment, during execution of the computer-executable instructions, the method further includes: if the actual-download node of the target file in the blockchain is determined, forwarding the file download request to the actual-download node; and extracting the file address information of the target file from the file download request.

In an embodiment, during execution of the computer-executable instructions, the method further includes: performing a hash operation on the target file to obtain a hash value of the target file; and generating the file address information of the target file based on the hash value and a predetermined character string.

In an embodiment, during execution of the computer-executable instructions, the method further includes: receiving a file upload request to upload the target file to the blockchain; controlling each node in the blockchain to perform consensus processing on the target file; and if all nodes in the blockchain reach a consensus, broadcasting or synchronizing the target file to each node in the blockchain.

In an embodiment, during execution of the computer-executable instructions, the returning the downloaded target file to the client includes: extracting identification information of the client from the file download request; if it is determined according to the identification information that the client is a mobile client, compressing the target file; and returning the compressed target file to the client.

The file processing device in this embodiment of the specification can implement the processes in the foregoing method embodiments and achieve same functions and effects. Details are not described herein again.

In addition, an embodiment of the specification also provides a storage medium for storing computer-executable instructions. In a specific embodiment, the storage medium may be a USB flash disk, an optical disk, a hard disk, etc. When the computer-executable instructions stored in the storage medium are executed by a processor, the following processes can be implemented: receiving a file download request of a client for a target file in a blockchain, the file download request including network address information of the client and file address information of the target file; determining a target blockchain node or an actual-download node of the target file in the blockchain based on the network address information of the client; and downloading the target file from the actual-download node based on the file address information, and returning the downloaded target file to the client.

In an embodiment, during execution of the computer-executable instructions in the storage medium by the processor, the determining an actual-download node of the target file in the blockchain based on the network address information of the client includes: selecting a first node closest to the client from a candidate node set based on the network address information of the client, the candidate node set including a node, in the blockchain, from which the client downloads a file a number of times greater than a predetermined threshold number; and using the first node as the actual-download node of the target file in the blockchain.

In an embodiment, during execution of the computer-executable instructions in the storage medium by the processor, the using the first node as the actual-download node of the target file in the blockchain includes: determining whether a load of the first node is less than a first predetermined threshold; if the load is less than the first predetermined threshold, using the first node as the actual-download node of the target file in the blockchain; and if the load is greater than or equal to the first predetermined threshold, determining the actual-download node of the target file in the blockchain through load balancing based on the network address information.

In an embodiment, during execution of the computer-executable instructions in the storage medium by the processor, the method further includes: after the downloading is completed, determining whether the actual-download node belongs to the candidate node set; if the actual-download node does not belong to the candidate node set, determining a number of times of downloading a file from the actual-download node; and if the number of downloading times is greater than the predetermined threshold number, adding the actual-download node to the candidate node set.

In an embodiment, during execution of the computer-executable instructions in the storage medium by the processor, the determining an actual-download node of the target file in the blockchain based on the network address information of the client includes: determining a second node in the blockchain closest to the client based on the network address information of the client; determining whether a load of the second node is less than a second predetermined threshold; if the load is less than the second predetermined threshold, using the second node as the actual-download node of the target file in the blockchain; and if the load is greater than or equal to the second predetermined threshold, determining the actual-download node of the target file in the blockchain through load balancing based on the network address information.

In an embodiment, during execution of the computer-executable instructions in the storage medium by the processor, the method further includes: if the actual-download node of the target file in the blockchain is determined, forwarding the file download request to the actual-download node; and extracting the file address information of the target file from the file download request.

In an embodiment, during execution of the computer-executable instructions in the storage medium by the processor, the method further includes: performing a hash operation on the target file to obtain a hash value of the target file; and generating the file address information of the target file based on the hash value and a predetermined character string.

In an embodiment, during execution of the computer-executable instructions in the storage medium by the processor, the method further includes: receiving a file upload request to upload the target file to the blockchain; controlling each node in the blockchain to perform consensus processing on the target file; and if all nodes in the blockchain reach a consensus, broadcasting or synchronizing the target file to each node in the blockchain.

In an embodiment, during execution of the computer-executable instructions in the storage medium by the processor, the returning the downloaded target file to the client includes: extracting identification information of the client from the file download request; if it is determined according to the identification information that the client is a mobile client, compressing the target file; and returning the compressed target file to the client.

The computer-readable storage medium in this embodiment of the specification can implement the processes in the foregoing method embodiments and achieve same functions and effects. Details are not described herein again.

In the 1990s, improvements of a technology can be clearly distinguished between hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced boolean expression language (ABEL), altera hardware description language (AHDL), Confluence, cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

For ease of description, when the apparatus is described, the apparatus is divided into units according to functions, which are separately described. Certainly, in implementation of the specification, the function of the units may be implemented in a same piece of or multiple pieces of software and/or hardware.

A person skilled in the art should understand that the embodiments of the specification may be provided as a method, a system, or a computer program product. Therefore, the specification may use a form of a hardware-only embodiment, a software-only embodiment, or an embodiment combining software and hardware. In addition, the specification may use a form of a computer program product implemented on one or more computer available storage media (including but not limited to a disk memory, a CD-ROM, an optical memory, and the like) including computer available program code.

The specification is described with reference to flowcharts and/or block diagrams of the method, the device (system), and the computer program product in the embodiments of the specification. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specific manner, so that the instructions stored in the computer readable memory generate a product including an instruction apparatus, where the instruction apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The memory may include, among computer readable media, a non-persistent memory such as a random access memory (RAM) and/or a non-volatile memory such as a read-only memory (ROM) or a flash memory (flash RAM). The memory is an example of the computer readable medium.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments. The storage medium may comprise a flash drive, a portable hard drive, ROM, RAM, a magnetic disk, an optical disc, another medium operable to store program code, or any combination thereof.

The computer readable medium includes a persistent medium and a non-persistent medium, a removable medium and a non-removable medium, which may implement storage of information by using any method or technology. The information may be a computer readable instruction, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition herein, the computer-readable medium does not include transitory computer readable media (transitory media), such as a modulated data signal and a carrier.

It should also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

A person skilled in the art should understand that the embodiments of the specification may be provided as a method, a system, or a computer program product. Therefore, the specification may use a form of hardware only embodiments, software only embodiments, or embodiments with a combination of software and hardware. In addition, the specification may use a form of a computer program product implemented on one or more computer available storage media (including but not limited to a disk memory, a CD-ROM, an optical memory, and the like) including computer available program code.

The specification can be described in the general context of computer executable instructions executed by a computer, for example, a program module. Generally, the program module includes a routine, a program, an object, a component, a data structure, and the like for executing a particular task or implementing a particular abstract data type. The specification can also be practiced in a distributed computing environment in which tasks are performed by remote processing devices that are connected through a communication network. In a distributed computing environment, the program module may be located in both local and remote computer storage media including storage devices.

The embodiments in this specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

The foregoing descriptions are merely embodiments of the specification and are not intended to limit the specification. For a person skilled in the art, various modifications and variations can be made to the specification. Any modification, equivalent replacement, or improvement made without departing from the spirit and principle of the specification shall fall within the scope of the claims of the specification.

What is claimed is:

1. A method for blockchain-based file processing, comprising:
   receiving, from a client, a request for downloading a target file stored in a blockchain, the request comprising a network address of the client and a file address of the target file, wherein the blockchain comprises a plurality of nodes and each node having stored the target file and network addresses of one or more other nodes of the plurality of nodes;
   determining, based on the network address information of the client, a set of candidate blockchain nodes in the blockchain from which the client has downloaded one or more files a number of times greater than a predetermined threshold number;
   determining a target blockchain node having a network address that is the closest to the network address of the client among the set of candidate blockchain nodes;
   downloading the target file from the determined target blockchain node based on the file address information; and
   returning the downloaded target file to the client.

2. The method of claim 1, wherein the determining the target blockchain node comprises:
   identifying a first blockchain node having a network address that is the closest to the network address of the client among the set of candidate blockchain nodes;
   determining whether a load of the target blockchain node is less than a threshold;
   if the load is less than the threshold, using the first blockchain node as the target blockchain node; and
   if the load is greater than or equal to the threshold, determining the target blockchain node through load balancing based on the network address information.

3. The method of claim 1, wherein the downloading the target file from the determined target blockchain node based on the file address information comprises:
   forwarding the request for downloading the target file to the determined target blockchain node; and
   extracting the file address of the target file from the request for downloading the target file.

4. The method of claim 1, further comprising:
   performing a hash operation on the target file to obtain a hash value of the target file; and
   generating the file address of the target file based on the hash value and a predetermined character string.

5. The method of claim 1, further comprising:
   receiving a request for uploading the target file to the blockchain; and
   broadcasting the target file to a plurality of blockchain nodes associated with the blockchain for storing based on consensus processing.

6. The method of claim 1, wherein the returning the downloaded target file to the client comprises:
   extracting identification information of the client from the request for downloading the target file;
   determining, based on the extracted identification information, that the client is a mobile client;
   compressing the target file; and
   returning the compressed target file to the client.

7. A system for blockchain-based file processing, comprising a processor and a non-transitory computer-readable storage medium storing instructions executable by the processor to cause the system to perform operations comprising:
   receiving, from a client, a request for downloading a target file stored in a blockchain, the request comprising a network address of the client and a file address of the target file, wherein the blockchain comprises a plurality of nodes and each node having stored the target file and network addresses of one or more other nodes of the plurality of nodes;
   determining, based on the network address information of the client, a set of candidate blockchain nodes in the blockchain from which the client has downloaded one or more files a number of times greater than a predetermined threshold number;
   determining a target blockchain node having a network address that is the closest to the network address of the client among the set of candidate blockchain nodes;
   downloading the target file from the determined target blockchain node based on the file address information; and
   returning the downloaded target file to the client.

8. The system of claim 7, wherein the determining the target blockchain node comprises:
   identifying a first blockchain node having a network address that is the closest to the network address of the client among the set of candidate blockchain nodes;

determining whether a load of the target blockchain node is less than a threshold;

if the load is less than the threshold, using the first blockchain node as the target blockchain node; and if the load is greater than or equal to the threshold, determining the target blockchain node through load balancing based on the network address information.

9. The system of claim 7, wherein the downloading the target file from the determined target blockchain node based on the file address information comprises:

forwarding the request for downloading the target file to the determined target blockchain node; and extracting the file address of the target file from the request for downloading the target file.

10. The system of claim 7, wherein the operations further comprise:

performing a hash operation on the target file to obtain a hash value of the target file; and generating the file address of the target file based on the hash value and a predetermined character string.

11. The system of claim 7, wherein the operations further comprise:

receiving a request for uploading the target file to the blockchain; and broadcasting the target file to a plurality of blockchain nodes associated with the blockchain for storing based on consensus processing.

12. The system of claim 7, wherein the returning the downloaded target file to the client comprises:

extracting identification information of the client from the request for downloading the target file;

determining, based on the extracted identification information, that the client is a mobile client;

compressing the target file; and returning the compressed target file to the client.

13. A non-transitory computer-readable storage medium for blockchain-based file processing, configured with instructions executable by one or more processors to cause the one or more processors to perform operations comprising:

receiving, from a client, a request for downloading a target file stored in a blockchain, the request comprising a network address of the client and a file address of the target file, wherein the blockchain comprises a plurality of nodes and each node having stored the target file and network addresses of one or more other nodes of the plurality of nodes;

determining, based on the network address information of the client, a set of candidate blockchain nodes in the blockchain from which the client has downloaded one or more files a number of times greater than a predetermined threshold number;

determining a target blockchain node having a network address that is the closest to the network address of the client among the set of candidate blockchain nodes;

downloading the target file from the determined target blockchain node based on the file address information; and returning the downloaded target file to the client.

14. The medium of claim 13, wherein the determining the target blockchain node comprises:

identifying a first blockchain node having a network address that is the closest to the network address of the client among the set of candidate blockchain nodes;

determining whether a load of the target blockchain node is less than a threshold;

if the load is less than the threshold, using the first blockchain node as the target blockchain node; and if the load is greater than or equal to the threshold, determining the target blockchain node through load balancing based on the network address information.

15. The medium of claim 13, wherein the downloading the target file from the determined target blockchain node based on the file address information comprises:

forwarding the request for downloading the target file to the determined target blockchain node; and extracting the file address of the target file from the request for downloading the target file.

16. The medium of claim 13, wherein the operations further comprise:

receiving a request for uploading the target file to the blockchain; and broadcasting the target file to a plurality of blockchain nodes associated with the blockchain for storing based on consensus processing.

17. The medium of claim 13, wherein the returning the downloaded target file to the client comprises:

extracting identification information of the client from the request for downloading the target file;

determining, based on the extracted identification information, that the client is a mobile client;

compressing the target file; and returning the compressed target file to the client.

18. The medium of claim 13, wherein the operations further comprise:

performing a hash operation on the target file to obtain a hash value of the target file; and generating the file address of the target file based on the hash value and a predetermined character string.

19. The method of claim 1, wherein the predetermined threshold number is determined according to a total number of times the client downloads files from the blockchain.

20. The system of claim 7, wherein the predetermined threshold number is determined according to a total number of times the client downloads files from the blockchain.

* * * * *